(12) United States Patent
Nakagawa et al.

(10) Patent No.: US 11,420,465 B2
(45) Date of Patent: Aug. 23, 2022

(54) ASSEMBLING STRUCTURE FOR TIRE WHEEL, BRAKE ROTOR, AND HUB

(71) Applicant: TOYOTA JIDOSHA KABUSHIKI KAISHA, Toyota (JP)

(72) Inventors: Kenji Nakagawa, Miyoshi (JP); Kazuki Nakahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 773 days.

(21) Appl. No.: 16/381,429

(22) Filed: Apr. 11, 2019

(65) Prior Publication Data

US 2019/0315156 A1    Oct. 17, 2019

(30) Foreign Application Priority Data

Apr. 12, 2018  (JP) .............................. JP2018-076677

(51) Int. Cl.
*B60B 3/16* (2006.01)
*B60B 27/00* (2006.01)
(Continued)

(52) U.S. Cl.
CPC ............... *B60B 3/16* (2013.01); *B60B 27/00* (2013.01); *F16B 43/00* (2013.01); *F16D 65/123* (2013.01);
(Continued)

(58) Field of Classification Search
CPC .... B60B 1/14; B60B 3/14; B60B 3/16; B60B 27/00; F16B 433/00
(Continued)

(56) References Cited

U.S. PATENT DOCUMENTS

| 6,267,210 B1 * | 7/2001 | Burgoon | ............. F16D 65/0006 |
| | | | 188/218 XL |
| 6,561,298 B2 * | 5/2003 | Buell | ...................... F02B 61/02 |
| | | | 180/221 |

(Continued)

FOREIGN PATENT DOCUMENTS

| CN | 1844684 A | 10/2006 |
| CN | 108407539 A | 8/2018 |

(Continued)

OTHER PUBLICATIONS

Extended European Search Report dated Jul. 25, 2019 issued by the European Patent Office in counterpart application No. 19167126.2.

*Primary Examiner* — Christopher P Schwartz
(74) *Attorney, Agent, or Firm* — Sughrue Mion, PLLC

(57) ABSTRACT

A structure for assembling a tire wheel, a brake rotor, and a hub includes at least one positioning bolt which includes a first head portion and a first shaft portion having a first male screw portion formed thereon; and a plurality of position-fixing bolts each of which includes a second head portion and a second shaft portion having a second male screw portion formed thereon. When an elastic body attached to the first shaft portion is squeezed between the hub and the first head portion of the positioning bolt as a result of the first male screw portion being screwed into a positioning female screw hole of the hub, the elastic body deforms to have an increased outer diameter as compared with the case where the elastic body is in its free state.

8 Claims, 11 Drawing Sheets

(51) Int. Cl.
*F16B 43/00* (2006.01)
*F16D 65/12* (2006.01)
*F16D 65/02* (2006.01)

(52) U.S. Cl.
CPC .. *B60B 2320/50* (2013.01); *F16D 2065/1384* (2013.01); *F16D 2065/1392* (2013.01); *F16D 2250/0084* (2013.01)

(58) Field of Classification Search
USPC ...... 188/18 A, 218 A, 218 XL; 301/6.1, 6.6, 301/6.8
See application file for complete search history.

(56) References Cited

U.S. PATENT DOCUMENTS

| | | | |
|---|---|---|---|
| 6,604,613 B2* | 8/2003 | Burgoon | F16D 65/12 |
| | | | 188/218 XL |
| 8,074,773 B2* | 12/2011 | Brittingham | B60B 27/00 |
| | | | 188/218 XL |
| 10,259,259 B2* | 4/2019 | Nakagawa | B60B 27/0052 |
| 2016/0016427 A1* | 1/2016 | Keller | B60B 3/16 |
| | | | 301/35.621 |
| 2018/0222250 A1 | 8/2018 | Nakagawa | |

FOREIGN PATENT DOCUMENTS

| | | | | |
|---|---|---|---|---|
| JP | 2014-218151 A | | 11/2014 | |
| WO | WO-2012107033 A2 * | | 8/2012 | ........... B60B 27/001 |
| WO | WO-2013083443 A1 * | | 6/2013 | ............... B60B 1/14 |

\* cited by examiner

ASSEMBLING STRUCTURE FOR TIRE WHEEL, BRAKE ROTOR, AND HUB

BACKGROUND OF THE INVENTION

Field of the Invention

The present invention relates to an assembling structure for assembling together a tire wheel, a brake rotor, and a hub provided in a vehicle.

Description of the Related Art

In the following description of the present specification, one side of a wheel in a direction along its rotation center axis will be referred to as the "outboard side," and the other side of the wheel in the direction along the rotation center axis will be referred to as the "inboard side." More specifically, for a wheel on the right side, its right side in the direction along the rotation center axis will be referred to as the "outboard side," and its left side in the direction along the rotation center axis will be referred to as the "inboard side." Similarly, for a wheel on the left side, its left side in the direction along the rotation center axis will be referred to as the "outboard side," and its right side in the direction along the rotation center axis will be referred to as the "inboard side."

Japanese Patent Application Laid-Open (kokai) No. 2014-218151 discloses an assembling structure for assembling together a tire wheel, a brake rotor (brake disc), and a hub in a vehicle.

The hub has a plurality of position-fixing female screw holes and a single positioning female screw hole. The position-fixing female screw holes are arranged along a circle whose center coincides with the rotation center axis of the hub.

The brake rotor located on the outboard side of the hub has a single positioning through hole and a plurality of position-fixing through holes, the number of which is equal to the number of the position-fixing female screw holes. The position-fixing through holes are located on the above-mentioned circle when viewed in the direction of the rotation center axis of the brake rotor. The position-fixing through holes are greater in diameter than the position-fixing female screw holes, and the positioning through hole is greater in diameter than the positioning female screw hole.

Relative rotation of the hub and the brake rotor about the rotation center axis is possible when the hub and the brake rotor are not fixed to each other with a positioning bolt and position-fixing bolts which will be described later.

The brake rotor and the hub are provisionally fixed to each other with the positioning bolt. The positioning bolt has a first head portion, and a first shaft portion which is smaller in dimeter than the first head portion. A first male screw portion is formed in a portion of the first shaft portion.

For provisional fixing of the brake rotor and the hub, the first shaft portion of the positioning bolt is first inserted into the positioning through hole of the brake rotor from the outboard side, and the first male screw portion is screwed into the positioning female screw hole for provisional tightening. As a result, a clearance is formed between the wall surface of the positioning through hole and the first shaft portion. Hereinafter, this clearance will be referred to as a first clearance.

Subsequently, through utilization of the first clearance, the relative rotational position of the brake rotor with respect to the hub; i.e., the position of the brake rotor in the circumferential direction about the rotation center axis, is finely adjusted so as to render each position-fixing through hole substantially coaxial with a corresponding one of the position-fixing female screw holes. Namely, the adjustment is performed such that, when viewed in the direction of the rotation center axis, each position-fixing female screw hole is located within the corresponding position-fixing through hole. In the following description, the work of finely adjusting the relative rotational position of the brake rotor with respect to the hub will be referred to as a "rotational phase adjustment work."

Subsequently, in a state in which the inboard-side surface of the brake rotor is in contact with the outboard-side surface of the hub, the amount of screw engagement of the first male screw portion with the positioning female screw hole of the hub is increased such that the first head portion of the positioning bolt comes into contact with the outboard-side surface of the brake rotor, whereby the brake rotor is provisionally fixed to the hub.

The tire wheel, to which a tire is detachably attached, is located on the outboard side of the brake rotor. The tire wheel has a plurality of wheel through holes, the number of which is equal to the number of the position-fixing female screw holes.

The tire wheel, which is rotatably supported on the brake rotor, is fixed to the hub and the brake rotor with position-fixing bolts, the number of which is equal to the number of the wheel through holes. Namely, the circumferential positions of the wheel through holes are rendered coincident with the circumferential positions of the position-fixing through holes, and the tire wheel is brought into contact with the brake rotor from the outboard side. While this state is maintained, the position-fixing bolts are inserted into the wheel through holes and the position-fixing through holes from the outboard side. Subsequently, the position-fixing bolts are screwed into the position-fixing female screw holes. As a result, the tire wheel is fixed to the hub and the brake rotor.

As described above, the first clearance is utilized for performing the rotational phase adjustment work. As the size of the first clearance in the circumferential direction (hereinafter referred to as the "first size") is smaller, the amount of misalignment between the position-fixing through holes and the position-fixing female screw holes is smaller after the provisional screwing of the first male screw portion into the positioning female screw hole. Therefore, as the first size is smaller, the degree of ease of the rotational phase adjustment work is greater.

However, as the first size is smaller, the degree of difficulty in inserting the positioning bolt (the first shaft portion) into the positioning through hole is greater. Namely, in this case, when slight misalignment occurs between the positioning through hole and the positioning bolt, a worker may fail to insert the positioning bolt into the positioning through hole.

SUMMARY OF THE INVENTION

The present invention has been accomplished so as to solve the above-described problem, and one object of the present invention is to provide a structure for assembling a tire wheel, a brake rotor, and a hub, which structure facilitates the work of adjusting the rotational phase of the brake rotor with respect to the hub by utilizing the positioning bolt and facilitates the work of inserting the positioning bolt into the positioning through hole.

In order to achieve the above-described object, the present invention provides an improved structure for assembling a tire wheel (40), a brake rotor (30), and a hub (20).

The hub (20) has at least one positioning female screw hole (29) and a plurality of position-fixing female screw holes (28) and is supported on a vehicle body to be rotatable about a predetermined rotation center axis (CA).

The brake rotor (30) has at least one positioning through hole (35) and a plurality of position-fixing through holes (33), faces the hub from one side in a direction of the rotation center axis, and is rotatable relative to the hub about the rotation center axis.

The tire wheel (40) has a plurality of wheel through holes (43) and faces the brake rotor from the one side.

The assembling structure comprises:

at least one positioning bolt (50) having a first head portion (51) facing a surface of the brake rotor on the one side, and a first shaft portion (52) which penetrates the at least one positioning through hole from the one side toward the other side in the direction of the rotation center axis and has a first male screw portion (53) to be screwed into the at least one positioning female screw hole;

a plurality of position-fixing bolts (60) each having a second head portion (61) which comes into contact with a surface of the tire wheel on the one side, and a second shaft portion (64) which penetrates a corresponding one of the wheel through holes and a corresponding one of the position-fixing through holes from the one side toward the other side and has a second male screw portion (65) to be screwed into a corresponding one of the position-fixing female screw holes so as to fix the tire wheel to the hub and the brake rotor while preventing the relative rotation of the brake rotor; and an annular elastic body (55, 66, 68, 70) attached to an outer circumferential surface of the first shaft portion and located in the positioning through hole, the elastic body having an outer diameter smaller than a diameter of the positioning through hole when the elastic body is in a free state, wherein, when the elastic body is squeezed between the first head portion and the hub as a result of the first male screw portion being screwed into the positioning female screw hole, the elastic body deforms to have an increased outer diameter as compared with the case where the elastic body is in the free state.

In the present invention, since the outer dimeter of the elastic body in its free state is smaller than the diameter of the positioning through hole, a clearance is formed between the elastic body and the inner circumferential surface of the positioning through hole. As the size of this clearance is greater, the positioning bolt (and the elastic body) can be more easily inserted into the positioning through hole.

Further, when the elastic body is squeezed between the first head portion and the hub as a result of the first male screw portion being screwed into the positioning female screw hole, the elastic body deforms to have an increased outer diameter as compared with the case where the elastic body is in the free state. Therefore, when the elastic body deforms in a state in which the elastic body is located within the positioning through hole, the clearance between the elastic body and the inner circumferential surface of the positioning through hole decreases. Accordingly, a worker can easily perform rotational phase adjustment work; i.e., work of adjusting the rotational phase of the brake rotor with respect to the hub, which is performed by making use of the positioning bolt.

Accordingly, the worker can easily perform the rotational phase adjustment work by making use of the positioning bolt, and can easily perform the work of inserting the positioning bolt into the positioning through hole.

According to another aspect of the present invention, the size (CLp) of a clearance formed between the elastic body and an inner circumferential surface of the positioning through hole when the elastic body is squeezed between the first head portion and the hub, the size being measured in a circumferential direction about the rotation center axis, is smaller than the size (CL2, L2) in the circumferential direction of a clearance between an inner circumferential surface of each of the position-fixing through holes and the second shaft portion of a corresponding one of the position-fixing bolts.

In this case, the worker can more easily perform the rotational phase adjustment work by making use of the positioning bolt.

According to still another aspect of the present invention, the elastic body has a chamfered portion (56, 66c) which is provided at its end on the side toward the hub and whose diameter decreases gradually toward the hub.

In this case, the positioning bolt (and the elastic body) can be inserted into the positioning through hole more easily.

According to still another aspect of the present invention, the elastic body (66) has slippage prevention portions (66a, 66b) which come into contact with the first head portion and the hub, respectively, thereby generating a resisting force against relative rotation of the elastic body about the first shaft portion with respect to the first head portion and the hub.

In this case, the axial tension of the positioning bolt becomes less likely to drop.

In the above description, in order to facilitate understanding of the present invention, the constituent elements of the invention corresponding to those of embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DETAILED DESCRIPTION OF THE EMBODIMENT

Figure 1:
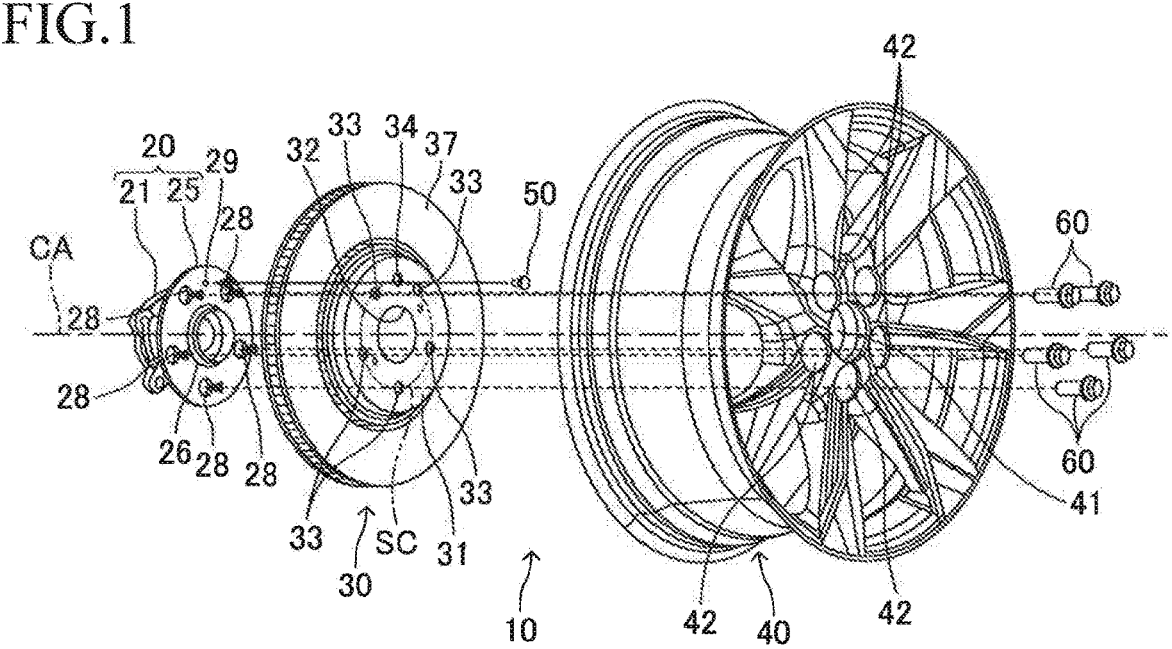
FIG. 1 is an exploded perspective view of a tire wheel, a brake rotor, a hub, a positioning bolt, and position-fixing bolts according to an embodiment of the present invention.
Figure 2:
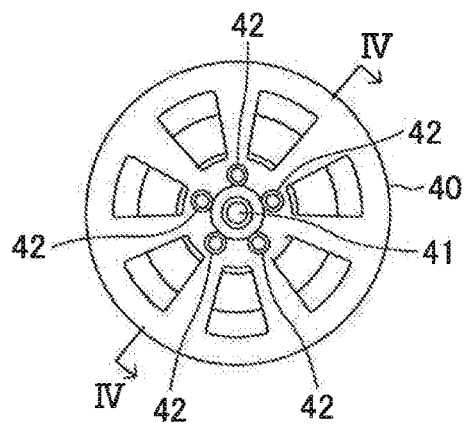
FIG. 2 is a side view of the tire wheel fixed to the brake rotor and the hub as viewed from the outboard side.

A structure for assembling a hub 20, a brake rotor 30, and a tire wheel 40 according to an embodiment of the present invention will be described with reference to FIGS. 1 to 8. As shown in FIG. 1, a wheel 10 of the present embodiment includes the hub 20, the brake rotor 30, and the tire wheel 40.

The hub 20 shown in FIG. 1 and FIGS. 4 to 8 is formed of a metal. The hub 20 has a hub main body 21 and a flange portion 25.

The hub main body 21 is an approximately circular columnar member whose center coincides with a rotation center axis CA.

Figure 4:
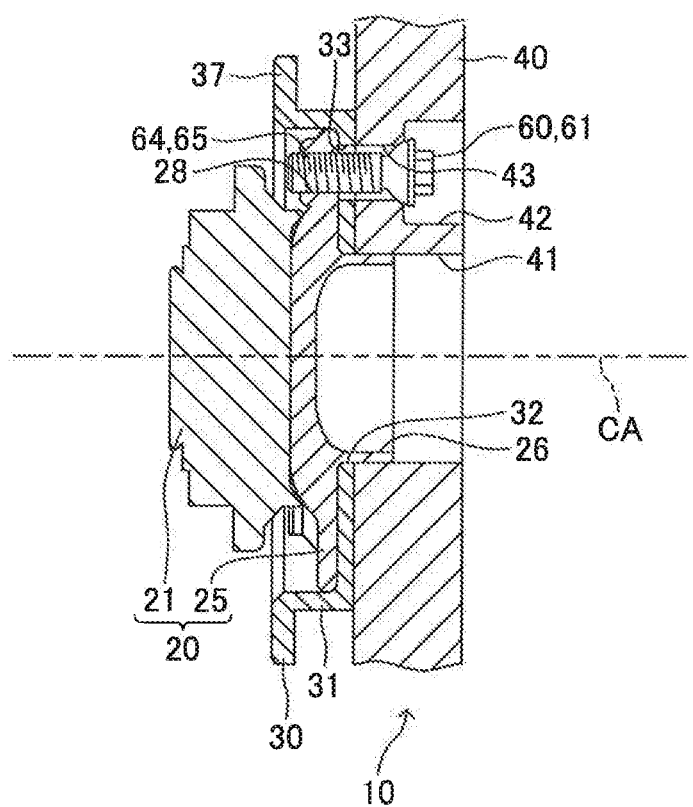
FIG. 4 is a sectional view of the tire wheel, the brake rotor, and the hub taken along line IV-IV of FIG. 2.

The flange portion 25 is an approximately disc-shaped member whose center coincides with the rotation center axis CA. As shown in FIGS. 1 and 4, a cylindrical first protrusion 26 whose center coincides with the rotation center axis CA is provided in a center portion of the outboard-side surface of the flange portion 25.

As shown in FIG. 1, five position-fixing female screw holes 28 are formed in the flange portion 25 at equal angular intervals in such a manner that the position-fixing female screw holes 28 are located on the radially outer side of the first protrusion 26 and are located on a single circle whose center coincides with the rotation center axis CA. Further, a single positioning female screw hole 29 is formed in the flange portion 25 to be located on the radially outer side of the first protrusion 26. The positioning female screw hole 29 is also located on the above-mentioned circle on which the position-fixing female screw holes 28 are located. The positioning female screw hole 29 is smaller in diameter than the position-fixing female screw holes 28.

As shown in FIG. 4, the outboard-side surface of the hub main body 21 and the inboard-side surface of the flange portion 25 face each other. The hub main body 21 and the flange portion 25 are connected to each other through a bearing mechanism (not shown) so as to allow relative rotation about their center axes.

The hub main body 21 is fixed to a hub carrier (not shown), which is one of suspension members. In the case where the wheel 10 is not a drive wheel, a spindle which extends horizontally and serves as the rotation center axis CA (see FIG. 1) is fixed to the flange portion 25. Meanwhile, in the case where the wheel 10 is a drive wheel, an end portion of a drive shaft which penetrates the hub carrier, extends horizontally, and serves as the rotation center axis CA is fixed to the flange portion 25.

The brake rotor 30 shown in FIG. 1 and FIGS. 4 to 8 is formed of a metal. The brake rotor 30 is located on the outboard side of the hub 20. The brake rotor 30 is an approximately disc-shaped member whose center coincides with the rotation center axis CA. The outer diameter of the brake rotor 30 is greater than the outer diameter of the flange portion 25. A second protrusion 31, which is an annular protrusion coaxial with the rotation center axis CA, is formed in a center portion of the outboard-side surface of the brake rotor 30. One first rotation support hole 32, which is coaxial with the rotation center axis CA and penetrates the brake rotor 30 (the second protrusion 31), is formed in a center portion of the brake rotor 30. The diameter of the first rotation support hole 32 is approximately the same as the outer diameter of the first protrusion 26 of the hub 20.

Five position-fixing through holes 33 having a circular cross section are formed in a center portion of the brake rotor 30 (namely, a portion where the second protrusion 31 is formed). The position-fixing through holes 33 penetrate the brake rotor 30 in a direction parallel to the rotation center axis CA. As shown in FIG. 1, the position-fixing through holes 33 are located on a single reference circle SC at equal angular intervals. The center of the reference circle SC coincides with the rotation center axis CA and has the same diameter as the above-mentioned circle on which the position-fixing female screw holes 28 are located. The position-fixing through holes 33 are larger in diameter than the position-fixing female screw holes 28.

One head portion recess 34 having a circular cross section is formed on the outboard-side surface of the brake rotor 30. Further, one positioning through hole 35 is formed in the brake rotor 30. The positioning through hole 35 penetrates the brake rotor 30 (the second protrusion 31) in a direction parallel to the rotation center axis CA. The sectional shape of the positioning through hole 35 is circular. The head portion recess 34 and the positioning through hole 35 are coaxial with each other and communicate with each other. As shown in FIG. 1, the head portion recess 34 and the positioning through hole 35 are located on the reference circle SC, on which the position-fixing through holes 33 are located. As shown in FIGS. 5 to 8, the diameter of the positioning through hole 35 is smaller than the diameters of the position-fixing through holes 33 and the head portion recess 34 and is larger than the dimeter of the positioning female screw hole 29.

As shown in FIGS. 1 and 4, the brake rotor 30 has a to-be-pressed portion 37 which is located on the radially outer side of the second protrusion 31 and is thinner than the center portion of the brake rotor 30. When unillustrated brake pads are pressed against the to-be-pressed portion 37, the brake rotor 30 generates braking force.

As shown in FIG. 4, the first protrusion 26 of the hub 20 is rotatably fitted into the first rotation support hole 32 of the brake rotor 30. Accordingly, when the flange portion 25 and the brake rotor 30 are not provisionally fixed (fixed) to each other with a positioning bolt 50 and position-fixing bolts 60, which will be described later, relative rotation of the flange portion 25 and the brake rotor 30 about the rotation center axis CA (the first protrusion 26 and the first rotation support hole 32) is possible.

The tire wheel 40 shown in FIGS. 1, 4, 7, and 8 is formed of a metal (for example, aluminum). An unillustrated tire is detachably attached to the outer circumferential surface of the tire wheel 40. The tire wheel 40 is located on the outboard side of the brake rotor 30.

As shown in FIG. 1, a second rotation support hole 41 coaxial with the rotation center axis CA is formed in the tire wheel 40 as a through hole. The diameter of the second rotation support hole 41 is approximately equal to the diameter of the first rotation support hole 32 of the brake rotor 30. As shown in FIGS. 1, 4, 7, and 8, five circular head portion recesses 42 are provided on the outboard-side surface of the tire wheel 40 to be located on the radially outer side of the second rotation support hole 41.

Figure 7:
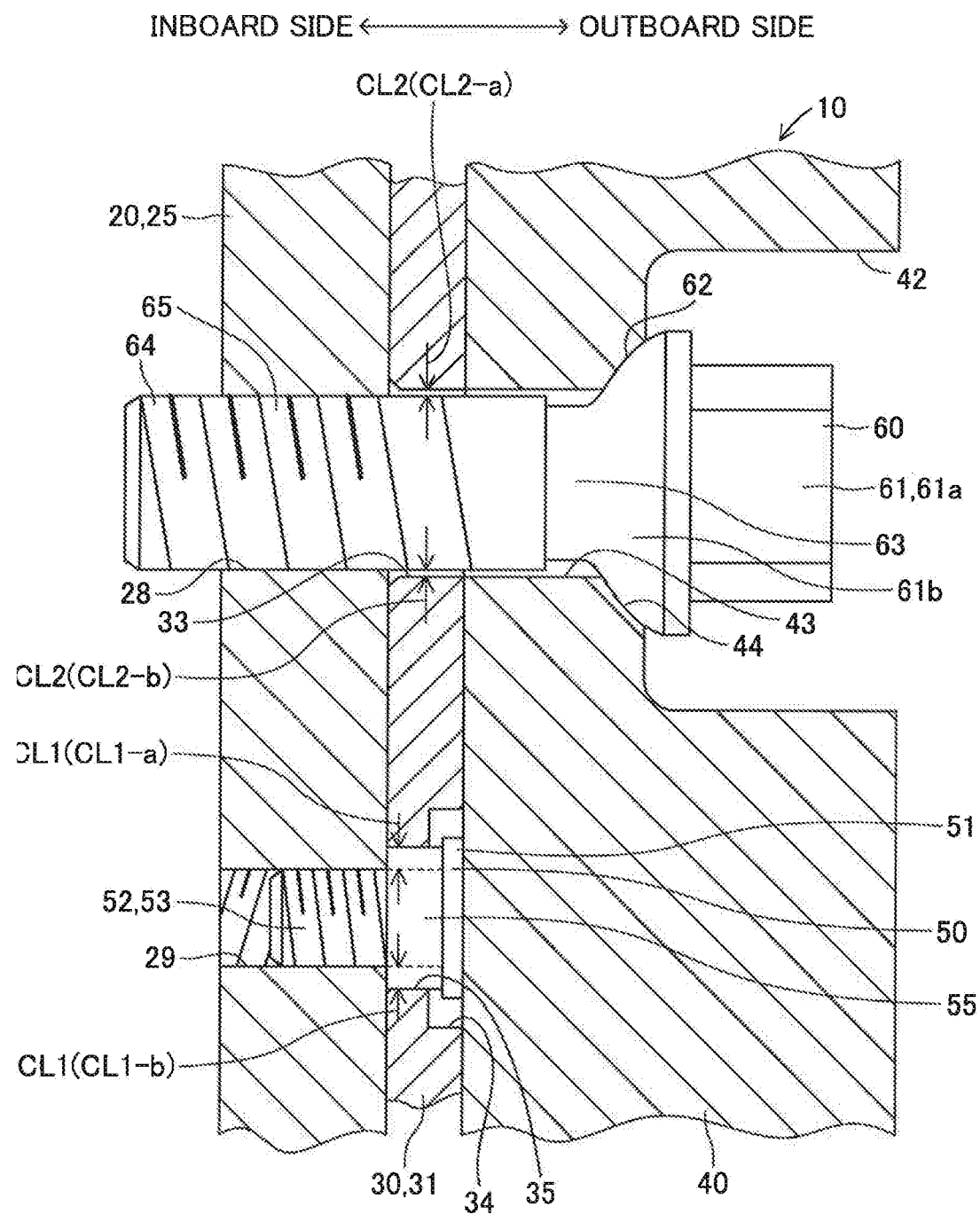
FIG. 7 is a sectional view of the tire wheel, the brake rotor and the hub which are cut along the reference circle after position-fixing bolts have been screwed into position-fixing female screw holes.
Figure 8:
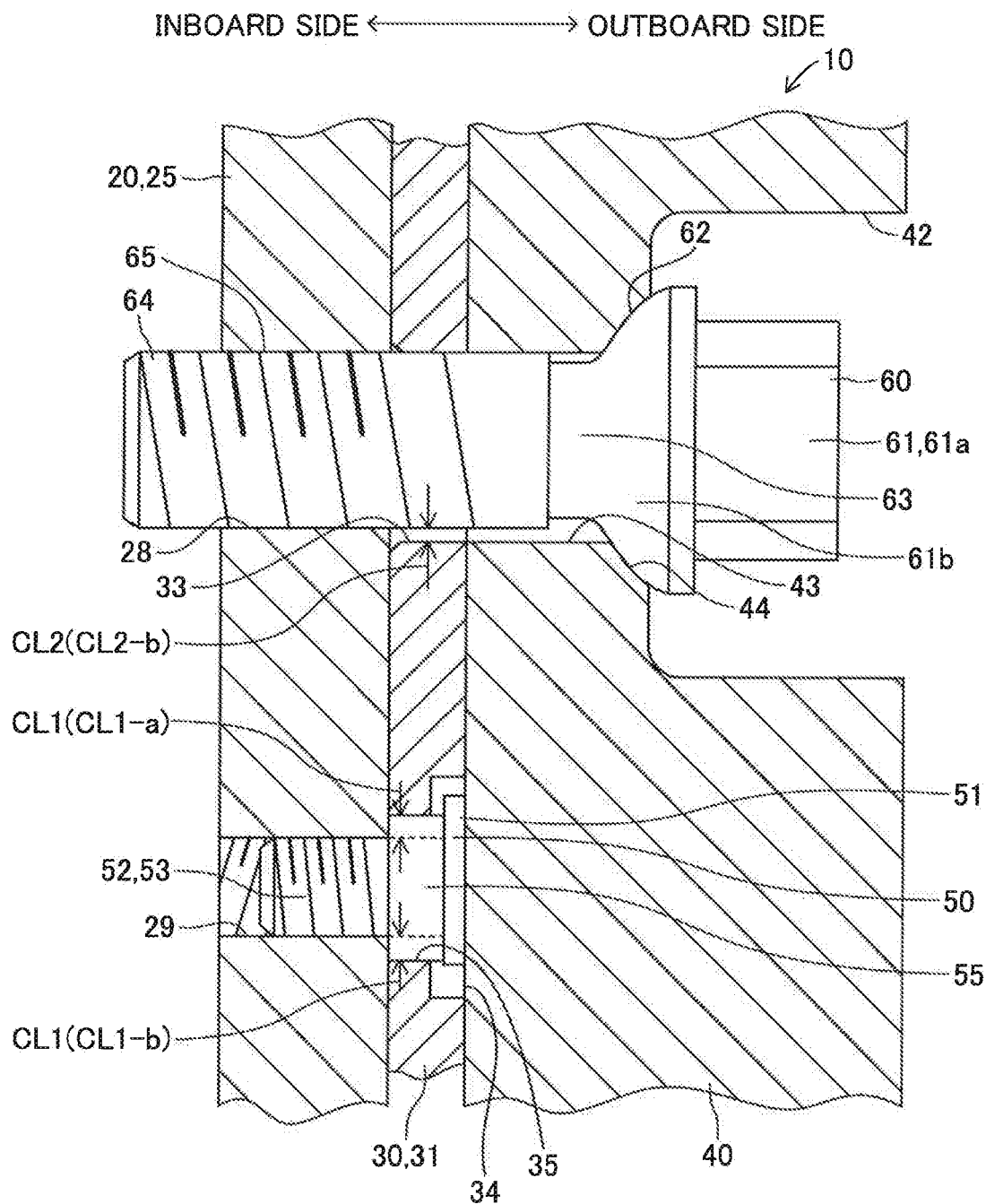
FIG. 8 is a sectional view corresponding to FIG. 7 and showing a state after relative rotation of the brake rotor with respect to the hub.

Further, as shown in FIGS. 4, 7, and 8, five wheel through holes 43 are formed on the inboard-side surface of the tire wheel 40 to be located on the radially outer side of the second rotation support hole 41. Each of the wheel through holes 43 extends in a direction parallel to the rotation center axis CA. The sectional shape of each wheel through hole 43 is circular. The head portion recesses 42 and the wheel through holes 43 are located on a single circle at equal angular intervals. The center of this circle coincides with the rotation center axis CA and has the same diameter as the reference circle SC. The diameter of the wheel through holes 43 is approximately the same as the diameter of the position-fixing through holes 33. The wheel through hole 43 and the head portion recess 42 at the same circumferential position are coaxial with each other and communicate with each other. The wheel through holes 43 are smaller in diameter than the head portion recesses 42. An end portion of each wheel through hole 43 on the head portion recess 42 side is formed by an annular curved surface 44, which is a portion of a spherical surface. The annular curved surface 44 is coaxial with the wheel through hole 43.

As shown in FIG. 4, the first protrusion 26 of the hub 20 is rotatably fitted into the second rotation support hole 41 of the tire wheel 40. Accordingly, when the tire wheel 40 is not fixed to the flange portion 25 and the brake rotor 30 with the position-fixing bolts 60, the tire wheel 40 can rotate about the rotation center axis CA (the first protrusion 26 and the second rotation support hole 41) relative to the flange portion 25 and the brake rotor 30.

As described above, the brake rotor 30 can be detachably attached to the hub 20, and the tire wheel 40 can be detachably attached to the hub 20 and the brake rotor 30. In the case where the hub 20, the brake rotor 30, and the tire wheel 40 are attached to one another for assembly, before attachment of the tire wheel 40 to the brake rotor 30, the brake rotor 30 is provisionally fixed to the flange portion 25 by making use of the single solid positioning bolt 50 formed of a metal.

As shown in FIG. 3 and FIGS. 5 to 8, the positioning bolt 50 includes a first head portion 51 and a first shaft portion 52 connected to the first head portion 51. Each of the first head portion 51 and the first shaft portion 52 has a circular sectional shape. The diameter of the first shaft portion 52 is smaller the diameter of the first head portion 51. The diameter of the first shaft portion 52 is smaller than the diameter of the positioning through hole 35 and is substantially equal to the diameter of the positioning female screw hole 29. Further, a first male screw portion 53 is formed on the outer circumferential surface of the first shaft portion 52. The diameter of the first head portion 51 is smaller than the diameter of the head portion recess 34 and is larger than the diameter of the positioning through hole 35. The first head portion 51 has a thickness smaller than the depth of the head portion recess 34.

Figure 3:
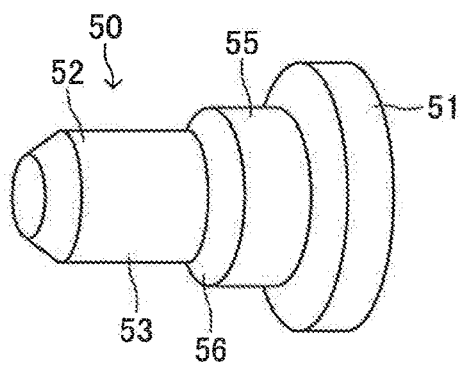
FIG. 3 is a perspective view of a positioning bolt and an elastic body which are integrated with each other.
Figure 5:
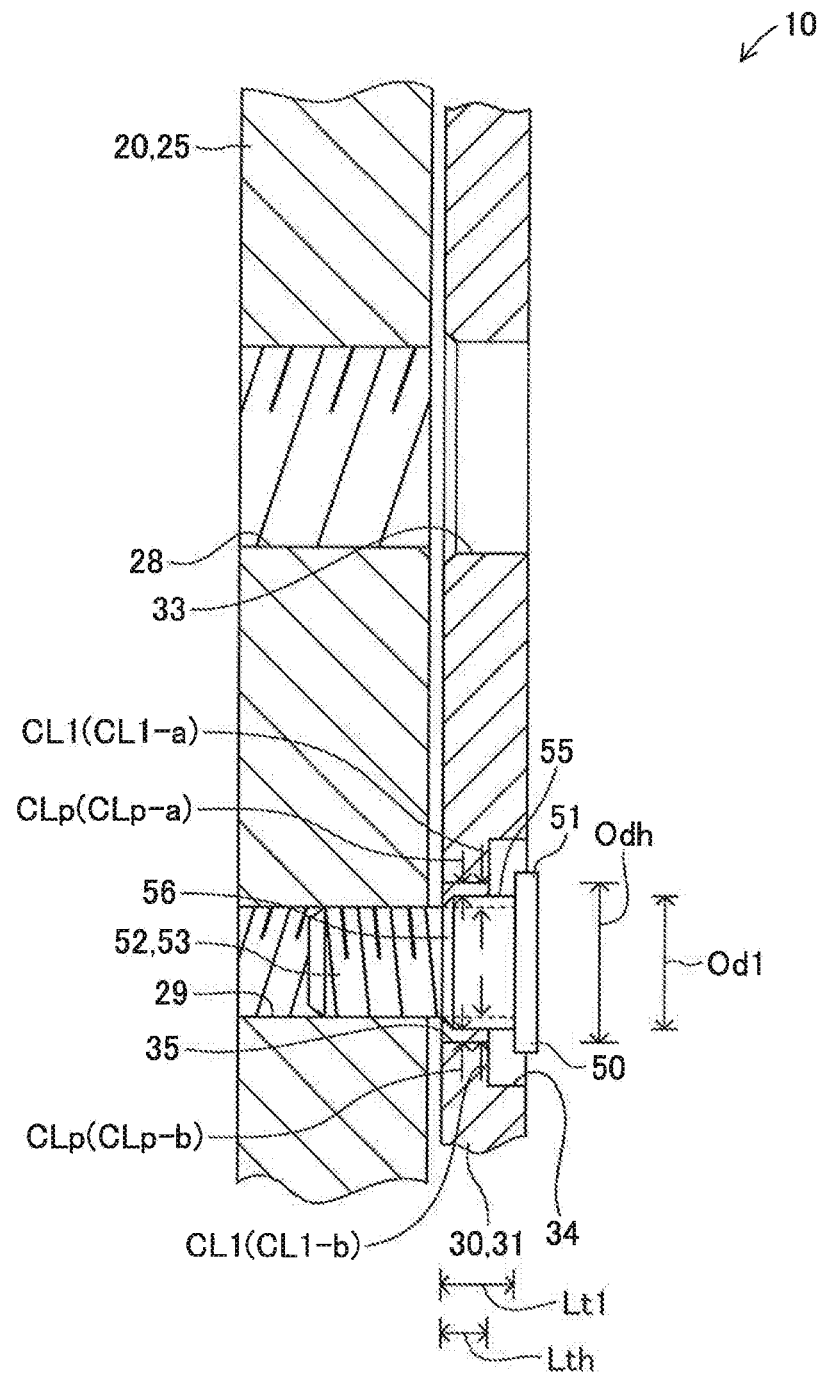
FIG. 5 is a sectional view of the brake rotor and the hub which are cut along a reference circle when a first male screw portion is in screw engagement with a positioning female screw hole and the elastic body is in a free state.

As shown in FIGS. 3 and 5, an elastic body 55, which is an annular member formed of a heat-resisting elastic material (for example, fluoro rubber), is attached, substantially in a free state, to the outer circumferential surface of the first shaft portion 52 of the positioning bolt 50. However, since the inner diameter of the elastic body 55 in the free state is substantially equal to the diameter of the first shaft portion 52, the elastic body 55 in the free state is unlikely to come off the first shaft portion 52. When the elastic body 55 is in the free state, the elastic body 55, excluding its end portion on the hub 20 side, has an approximately constant outer diameter. The elastic body 55 has a chamfered portion 56 which is formed at its end on the hub 20 side and whose diameter decreases gradually toward the hub 20 when the elastic body 55 is in the free state.

As shown in FIG. 5, the positioning bolt 50 and the elastic body 55 integrated with each other are inserted into the head portion recess 34 and the positioning through hole 35 of the brake rotor 30 from the outboard side. The first shaft portion 52 of the positioning bolt 50 penetrates the positioning through hole 35, and the first male screw portion 53 is screwed into the positioning female screw hole 29 of the hub 20.

In FIG. 5, the distance between the outboard-side surface of the flange portion 25 and the inboard-side surface of the first head portion 51 is larger than the axial length of the elastic body 55, and a portion of the first shaft portion 52 and a portion of the elastic body 55 are located within the positioning through hole 35. At that time, the first head portion 51 is spaced from the bottom surface of the head portion recess 34 toward the outboard side, and the elastic body 55 is spaced from the outboard-side surface of the flange portion 25 toward the outboard side. Therefore, the elastic body 55 is in its free state.

When the elastic body 55 is in the free state, the outer diameter Od1 of the elastic body 55 is smaller than the diameter Odh of the positioning through hole 35. Therefore, even when the positioning through hole 35 and the first shaft portion 52 are slightly misaligned with each other, the first shaft portion 52 and the elastic body 55 can be inserted into the positioning through hole 35. Namely, the first shaft portion 52 and the elastic body 55 can be easily inserted into the positioning through hole 35. Further, when the elastic body 55 is in the free state, the axial length Lt1 of the elastic body 55 is larger than the axial length Lth of the positioning through hole 35.

Figure 6:
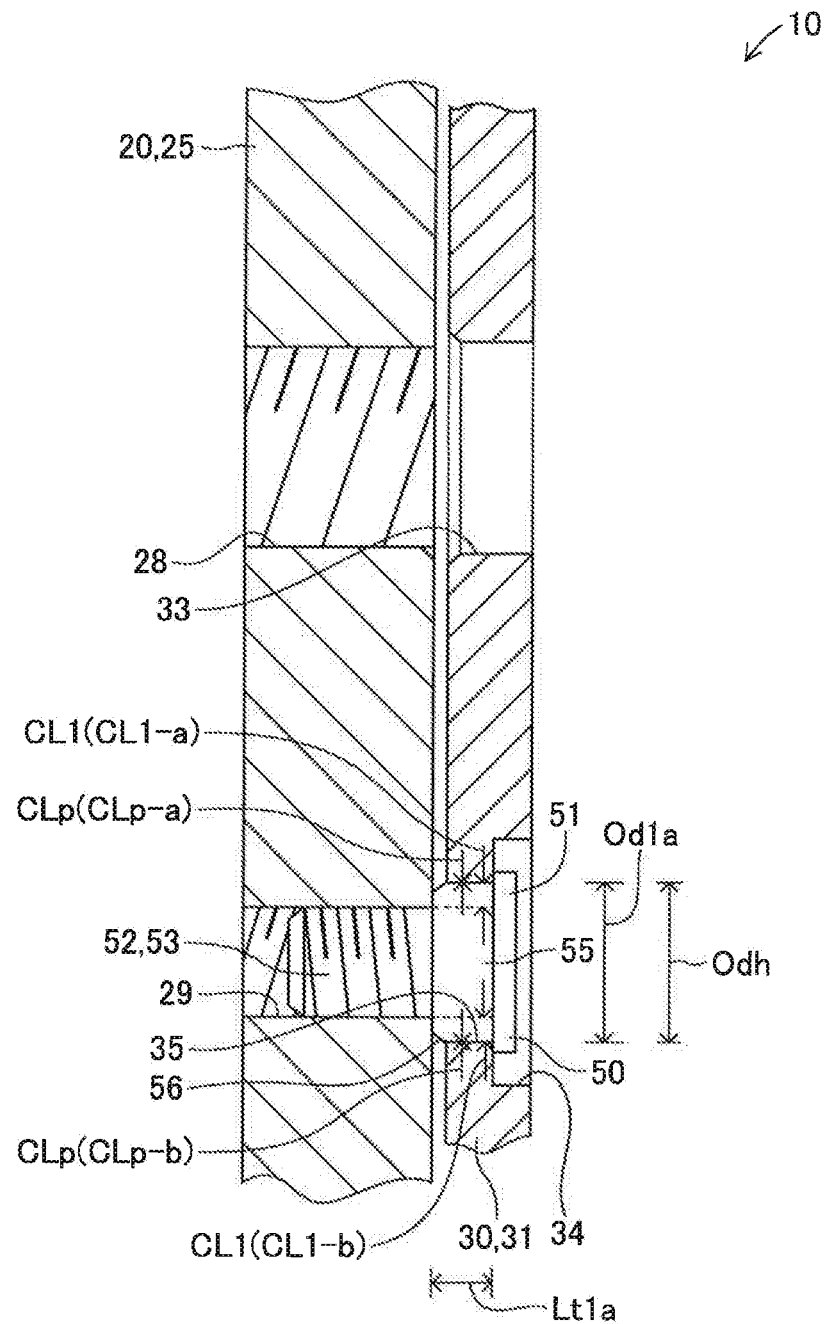
FIG. 6 is a sectional view corresponding to FIG. 5 and showing a state after the elastic body has elastically deformed.

As shown in FIGS. 5 and 6, a clearance is formed between the inner circumferential surface of the positioning through hole 35 and the outer circumferential surface of the elastic body 55. In the following description, the clearance formed between the inner circumferential surface of the positioning through hole 35 and the outer circumferential surface of a portion of the elastic body 55 located on the outboard side of the chamfered portion 56 will be referred to as a positioning clearance CLp. For example, when the elastic body 55 in the free state and the positioning through hole 35 are approximately coaxial with each other as shown in FIG. 5, two clearances CLp-a and CLp-b are formed between the elastic body 55 and the inner circumferential surface of the positioning through hole 35. Accordingly, the positioning clearance CLp is formed by the two clearances CLp-a and CLp-b. The sum of the sizes (widths) of the clearances CLp-a and CLp-b is equal to the entire length of the positioning clearance CLp in the direction of the reference circle SC.

The greater the positioning clearance CLp when the elastic body 55 is in the free state, the greater the degree of ease of insertion of the first shaft portion 52 and the elastic body 55 into the positioning through hole 35.

In an assumed case where the elastic body 55 is removed from the first shaft portion 52, as shown in FIGS. 5 to 8, a clearance is formed between the inner circumferential surface of the positioning through hole 35 and the outer circumferential surface of the first shaft portion 52. In the following description, the imaginal clearance formed between the inner circumferential surface of the positioning through hole 35 and the first shaft portion 52 when the elastic body 55 is removed from the first shaft portion 52 will be referred to as a first clearance CL1. For example, when the positioning bolt 50 and the positioning through hole 35 are approximately coaxial with each other, two clearances CL1-a and CL1-b are formed between the first shaft portion 52 and the inner circumferential surface of the positioning through hole 35. Accordingly, the first clearance CL1 is formed by the two clearances CL1-a and CL1-b. A first size L1 which is the sum of the sizes (widths) of the clearances CL1-a and CL1-b is equal to the entire length of the first clearance CL1 in the direction of the reference circle SC.

Subsequently, the amount of screw engagement of the first male screw portion 53 with the positioning female screw hole 29 is increased in the state of FIG. 5. As a result, as shown in FIG. 6, the first head portion 51 comes into contact with the bottom surface of the head portion recess 34, and the distance between the outboard-side surface of the flange portion 25 and the inboard-side surface of the first head portion 51 becomes smaller than the axial length Lt1 of the elastic body 55 in the free state. Therefore, the elastic body 55 exerts forces on the outboard-side surface of the flange portion 25 and the inboard-side surface of the first head portion 51, while elastically deforming. In other words, the elastic body 55 is squeezed between the outboard-side surface of the flange portion 25 and the inboard-side surface of the first head portion 51. When the hub 20 and the brake rotor 30 are provisionally fixed to each other with the positioning bolt 50 as described above, the elastic body 55 elastically deforms such that the elastic body 55 has an axial length Lt1a smaller than the axial length Lt1. Notably, in FIG. 6, the outboard-side surface of the flange portion 25 and the inboard-side surface of the brake rotor 30 are slightly spaced from each other.

At that time, as shown in FIG. 6, the elastically deformed elastic body 55 has an outer diameter Od1a larger than the outer diameter Od1. The outer diameter Od1a is substantially equal to the diameter Odh of the positioning through hole 35. Namely, the greater part of the outer circumferential surface of the elastic body 55 comes into contact with the inner circumferential surface of the positioning through hole 35, and presses the inner circumferential surface of the positioning through hole 35 radially outward, while almost the entirety of the elastic body 55 elastically deforms in an approximately uniform manner. In other words, the positioning clearance CLp at that time is zero. Therefore, in the case where the elastic body 55 generates a sufficiently large elastic urging force, even when a worker does not finely adjust the rotational position of the brake rotor 30 with, for example, his or her hands, the size of the clearance CL1-a in the direction of the reference circle SC and the size of the clearance CL1-b in the direction of the reference circle SC become approximately equal to each other. In other words, the positioning female screw hole 29 (the positioning bolt 50) and the positioning through hole 35 become approximately coaxial with each other.

In this state, through utilization of the first clearance CL1 and the elastic deformation of the elastic body 55, the worker can finely adjust the relative rotational position of the brake rotor 30 in the direction of the reference circle SC with respect to the hub 20.

However, in the case where, as described above, the positioning female screw hole 29 and the positioning through hole 35 have become approximately coaxial with each other due to the elastic urging force generated by the elastic body 55, even when the worker does not finely adjust the position of the brake rotor 30, each position-fixing female screw hole 28 is located within a corresponding one of the position-fixing through holes 33 as viewed in the direction of the rotation center axis CA. In the case where the elastic urging force generated by the elastic body 55 is not large, since a difference arises between the size of the clearance CL1-a in the direction of the reference circle SC and the size of the clearance CL1-b in the direction of the reference circle SC, a slight degree of misalignment occurs between the positioning female screw hole 29 and the positioning through hole 35. In this case as well, the positioning clearance CLp is zero (smaller than a second clearance CL2 which will be described later). Therefore, when the worker rotates the brake rotor 30 by a small amount relative to the flange portion 25 with his/hear hands while deforming the elastic body 55, each position-fixing female screw hole 28 is located within a corresponding one of the position-fixing through holes 33 when viewed in the direction of the rotation center axis CA. As described above, in the present embodiment, since the positioning clearance CLp is zero, the worker can easily perform the rotational phase adjustment work.

As described above, in the present embodiment, the outer diameter Od1 of the elastic body 55 in the free state is set to be small, thereby increasing the size of the positioning clearance CLp. As a result, insertion of the positioning bolt 50 and the elastic body 55 into the positioning through hole 35 becomes easier. Further, the elastic body 55 is elastically deformed between the outboard-side surface of the flange portion 25 and the inboard-side surface of the first head portion 51 so as to decrease the size of the positioning clearance CLp (to zero). Thus, the rotational phase adjustment work can be performed easily. Namely, in the present embodiment, the worker can easily perform both the work of inserting the positioning bolt 50 and the elastic body 55 into the positioning through hole 35 and the rotational phase adjustment work.

Subsequently, as shown in FIGS. 4 and 7, the inboard-side surface of the tire wheel 40 is brought into contact with the outboard-side surface of the second protrusion 31 of the brake rotor 30, provisionally fixed to the flange portion 25, in such a manner that the first protrusion 26 of the hub 20 is rotatably fitted into the second rotation support hole 41 of the tire wheel 40. As will be described below, the tire wheel 40 is fixed to the flange portion 25 and the brake rotor 30 by utilizing the five position-fixing bolts 60.

As shown in FIGS. 7 and 8, each position-fixing bolt 60 which is solid and formed of the same metal as the positioning bolt 50 includes a second head portion 61, a second small-diameter shaft portion 63, and a second large-diameter shaft portion 64.

The second head portion 61 has a distal end portion 61a and a pressure contract portion 61b. The sectional shape of the distal end portion 61a is hexagonal. The outer circumferential surface of the pressure contract portion 61b is formed by an annular curved surface 62 which is a portion of a spherical surface having approximately the same curvature as the annular curved surface 44. Namely, the sectional shape of the pressure contract portion 61b is circular. The diameter of a largest diameter portion of the annular curved surface 62 is greater than that of a largest diameter portion of the annular curved surface 44.

The second small-diameter shaft portion 63 connected to the pressure contract portion 61b and the second large-diameter shaft portion 64 connected to the second small-diameter shaft portion 63 each have a circular sectional shape. Further, a second male screw portion 65 is formed on the outer circumferential surface of the second large-diameter shaft portion 64. The second small-diameter shaft portion 63 is smaller in diameter than the pressure contract portion 61b and the second large-diameter shaft portion 64. The second large-diameter shaft portion 64 is larger in diameter than the first shaft portion 52.

The diameter of the second large-diameter shaft portion 64 is substantially equal to the diameter of the position-fixing female screw holes 28. The diameter of the second large-diameter shaft portion 64 is smaller than the diameter of the position-fixing through holes 33 and the diameter of the wheel through holes 43.

As shown in FIG. 7, each position-fixing bolt 60 is inserted, from the outboard side, into a corresponding one of the head portion recesses 42 of the tire wheel 40, a corresponding one of the wheel through holes 43 of the tire wheel 40, a corresponding one of the position-fixing through holes 33 of the brake rotor 30, and a corresponding one of the position-fixing female screw holes 28 of the hub 20.

The second large-diameter shaft portion 64 of the position-fixing bolt 60 penetrates the wheel through hole 43 and the position-fixing through hole 33, and the second male screw portion 65 is screwed into the position-fixing female screw hole 28. As a result, the annular curved surface 62 of the pressure contract portion 61b of the position-fixing bolt 60 is pressed against the annular curved surface 44 of the tire wheel 40, and the brake rotor 30 (the second protrusion 31) is squeezed between the flange portion 25 and the tire wheel 40. Namely, through use of the five position-fixing bolts 60, the tire wheel 40 is fixed to the flange portion 25 and the brake rotor 30 in a state in which the flange portion 25 and the brake rotor 30 are in contact with each other.

When the second large-diameter shaft portion 64 is inserted into the position-fixing through hole 33, a clearance is formed between the inner circumferential surface of the position-fixing through hole 33 and the outer circumferential surface of the second large-diameter shaft portion 64. In the following description, this clearance will be referred to as a "second clearance CL2."

For example, in the case where the second large-diameter shaft portion 64 and the position-fixing through hole 33 are approximately coaxial with each other as shown in FIG. 7, two clearances CL2-a and CL2-b are formed between the second large-diameter shaft portion 64 and the inner circumferential surface of the position-fixing through hole 33. Accordingly, the second clearance CL2 is formed by the two clearances CL2-a and CL2-b. A second size L2 which is the sum of the sizes (widths) of the clearances CL2-a and CL2-b in FIG. 7 is equal to the entire length of the second clearance CL2 in the direction of the reference circle SC.

In the present embodiment, the sectional shapes of the position-fixing through holes 33, the positioning through hole 35, the first shaft portion 52, and the second large-diameter shaft portion 64 are set such that the first size L1 of the first clearance CL1 is greater than the second size L2 of the second clearance CL2.

Further, in the present embodiment, the size of the positioning clearance CLp in the direction of the reference circle SC after the elastic body 55 has elastically deformed as shown in FIG. 6 as a result of provisional fixing of the hub 20 and the brake rotor 30 with the positioning bolt 50 (hereinafter the size of the positioning clearance CLp will be referred to as the positioning size) is smaller than the second size L2 (namely, the positioning size is zero). If the positioning size after the provisional fixing is rendered greater than the second size L2, the following problem occurs. In the case where the brake rotor 30 is rotated relative to the flange portion 25 over a distance corresponding to the positioning size, a portion of the position-fixing female screw hole 28 is located outside the corresponding position-fixing through hole 33 when viewed in the direction of the rotation center axis CA. In such a case, the second male screw portion 65 of the position-fixing bolt 60 inserted into the position-fixing through hole 33 cannot be screwed into the position-fixing female screw hole 28. Namely, in the case where the positioning size is greater than the second size L2, the rotational phase adjustment work cannot be performed easily.

Incidentally, as described above, through use of the five position-fixing bolts 60, the tire wheel 40 is fixed to the hub 20 and the brake rotor 30 in a state in which the flange portion 25 and the brake rotor 30 are in contact with each other. Namely, the brake rotor 30, which has been spaced from the flange portion 25 toward the outboard side as shown in FIG. 6, moves toward the inboard side and comes into contact with the outboard-side surface of the flange portion 25 as shown in FIG. 7. As a result, as shown in FIG. 7, the bottom surface of the head portion recess 34 may separate from the first head portion 51 toward the inboard side. Alternatively, although not illustrated, the contact between the bottom surface of the head portion recess 34 and the first head portion 51 is maintained, but the contact pressure between the first head portion 51 and the brake rotor 30 (seating surface pressure) may drop.

However, the elastically deformed elastic body 55 substantially maintains the shape shown in FIG. 6. In other words, the elastic body 55 is still squeezed between the outboard-side surface of the flange portion 25 and the inboard-side surface of the first head portion 51. Accordingly, in this case, the axial tension of the positioning bolt 50 (and the elastic body 55) does not decrease.

Further, the diameter of the second large-diameter shaft portion 64 is larger than the diameter of the first shaft portion 52. The material of the positioning bolt 50 is the same as the material of the position-fixing bolts 60. Accordingly, the mechanical strength of the second large-diameter shaft portion 64 is greater than that of the first shaft portion 52.

When a vehicle to which the wheel 10 is attached travels on a road while rotating a tire attached to the outer circumferential surface of the tire wheel 40, vibrations are transmitted from the surface of the road to the tire wheel 40, the brake rotor 30, and the hub 20 through the tire. Therefore, when the total travel distance of the vehicle increases, the axial tension of each position-fixing bolt 60 may decrease. In such a case, as shown in FIG. 8, due to the rotational force from the tire, the brake rotor 30 rotates about the rotation center axis CA in the direction of the reference circle SC with respect to the flange portion 25 (in the example of FIG. 8, the illustrated portion of the brake rotor 30 moves toward the lower side of FIG. 8 with respect to the hub 20).

However, since the elastic body 55 is attached to the first shaft portion 52 of the positioning bolt 50, when the brake rotor 30 rotates relative to the flange portion 25 due to a decrease in the axial tension of each position-fixing bolt 60, the inner circumferential surface of the positioning through hole 35 does not collide against the first shaft portion 52.

Meanwhile, as shown in FIG. 8, when the brake rotor 30 rotates relative to the flange portion 25, the inner circumferential surface of each position-fixing through hole 33 collides against the outer circumferential surface of the second large-diameter shaft portion 64 of the corresponding position-fixing bolt 60. Namely, the rotational force of the brake rotor 30 is not received by the first shaft portion 52 and is received by the second large-diameter shaft portion 64 whose mechanical strength is greater than that of the first shaft portion 52. In addition, each of the number of the position-fixing through holes 33 and the number of the position-fixing bolts 60 is five (not one). Namely, the five position-fixing bolts 60 (the second large-diameter shaft portions 64) receives a portion of the rotational force of the brake rotor 30. Accordingly, when the brake rotor 30 rotates relative to the flange portion 25, the position-fixing bolts 60 are less likely to be damaged.

Notably, when the brake rotor 30 rotates relative to the flange portion 25, the positioning through hole 35 moves relative to the first shaft portion 52. However, the greater part of the moving force of the positioning through hole 35 is absorbed by the elastic body 55. Therefore, the moving force of the positioning through hole 35 hardly acts on the first shaft portion 52. Accordingly, when the brake rotor 30 rotates relative to the flange portion 25, the positioning bolt 50 is less likely to be damaged.

Also, the elastic body 55 can be manufactured at low cost. Accordingly, the production cost of the wheel 10 can be reduced.

Notably, the present invention is not limited to the above-described embodiment, and various modifications can be employed within the scope of the present invention.

Figure 9:
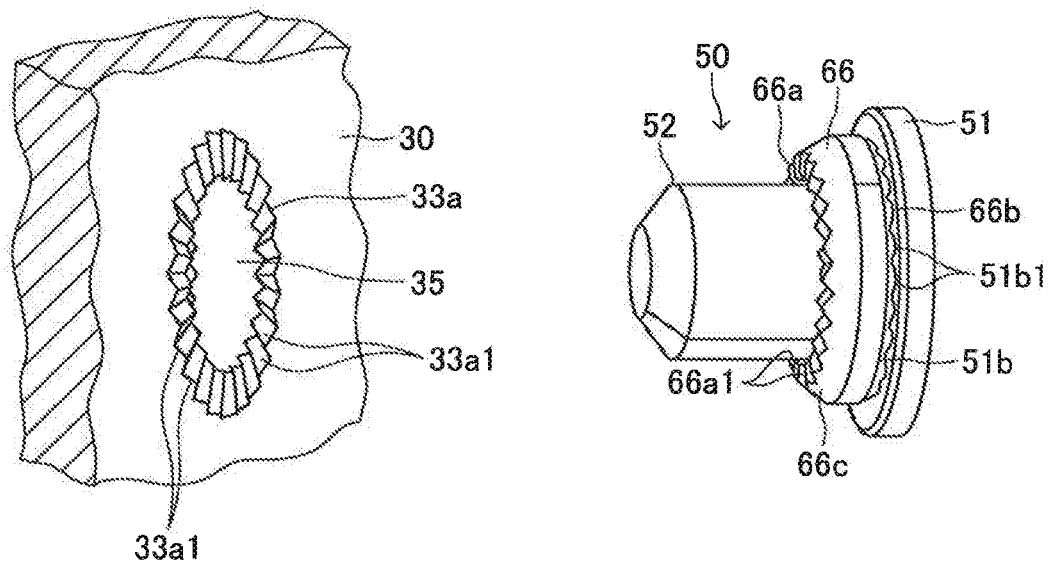
FIG. 9 is a perspective view of a brake rotor and an integral unit of a positioning bolt and an elastic body used in a first modification of the present invention.
Figure 10:
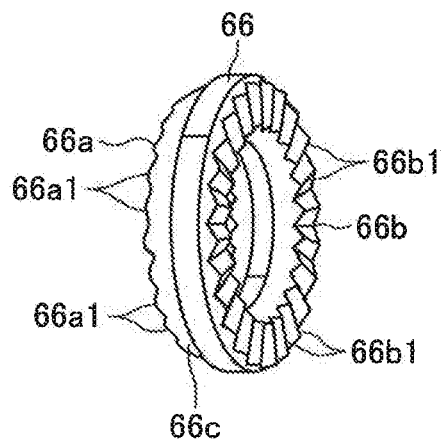
FIG. 10 is a perspective view of the elastic body used in the first modification.

FIGS. 9 and 10 show a first modification of the present invention. The material of an elastic body 66 which is an annular member in the first modification is the same as the elastic body 55. The outer diameter and axial length of the elastic body 66 in its free state are identical with those of the elastic body 55. Further, the elastic body 66 has a chamfered portion 66c at its end on the inboard side.

A first slippage prevention portion 66a is formed on the inboard-side surface of the elastic body 66, and a second slippage prevention portion 66b is formed on the outboard-side surface of the elastic body 66. The first slippage prevention portion 66a and the second slippage prevention portion 66b have an annular shape and extend about the center axis of the elastic body 66. The first slippage prevention portion 66a has a large number of first protrusions 66a1 which extend radially (in radial directions) with respect to the center axis and are arranged at equal intervals in the circumferential direction. The second slippage prevention portion 66b has a large number of second protrusions 66b1 which extend radially (in radial directions) with respect to the center axis and are arranged at equal intervals in the circumferential direction. The first protrusions 66a1 and the second protrusions 66b1 have an approximately triangular columnar shape.

Meanwhile, an annular first mating portion 33a is formed on the outboard-side surface of the brake rotor 30 in the first modification to be located on the radially outer side of the positioning through hole 35. The first mating portion 33a has first recesses 33a1, the number of which is equal to the number of the first protrusions 66a1 and which have a shape corresponding to the shape of the first protrusions 66a1. The first recesses 33a1 are arranged at equal intervals in the circumferential direction. Further, an annular second mating portion 51b is formed on the inboard-side surface of the first head portion 51 of the positioning bolt 50 in the first modification such that the second mating portion 51b is located on the radially outer side of the first shaft portion 52. The second mating portion 51b has second recesses 51b1, the number of which is equal to the number of the second protrusions 66b1 and which have a shape corresponding to the shape of the second protrusions 66b1. The second recesses 51b1 are arranged at equal intervals in the circumferential direction.

The elastic body 66 is attached, in its free state, to the first shaft portion 52 in such a manner that the second protrusions 66b1 of the second slippage prevention portion 66b are fitted into the second recesses 51b of the second mating portion 51b. Further, when the brake rotor 30 is provisionally fixed to the flange portion 25 by using the positioning bolt 50 and the elastic body 66 in the same manner as shown in FIG. 6, the first protrusions 66a1 of the first slippage prevention portion 66a are fitted into the first recesses 33a1 of the first mating portion 33a.

Therefore, when the brake rotor 30 is provisionally fixed to the hub 20 by using the positioning bolt 50 and the elastic body 66 of the first modification, the first mating portion 33a, the second mating portion 51b, the first slippage prevention portion 66a, and the second slippage prevention portion 66b generate a resisting force against rotation of the elastic body 66 about the first shaft portion 52 with respect to the brake rotor 30 and the first head portion 51. Accordingly, the positioning bolt 50 and the elastic body 66 used in the first modification are less likely to cause a decrease in axial tension as compared with the positioning bolt 50 and the elastic body 55 used in the above-described embodiment.

Figure 11:
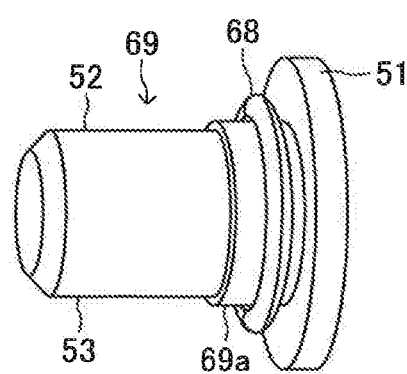
FIG. 11 is a perspective view of an integral unit of a positioning bolt and an elastic body used in a second modification of the present invention.
Figure 12:
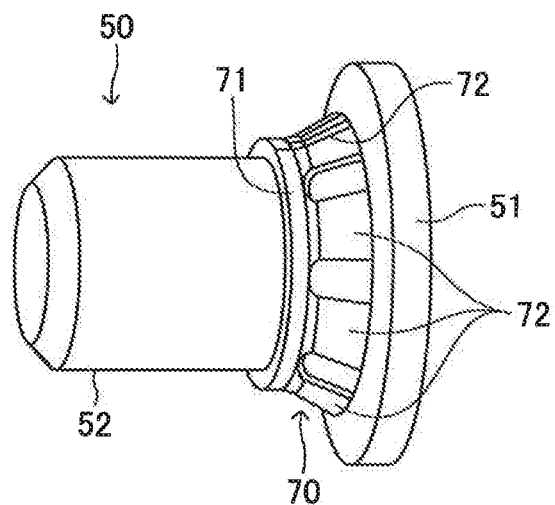
FIG. 12 is a perspective view of an integral unit of a positioning bolt and an elastic body used in a third modification of the present invention.
Figure 13:
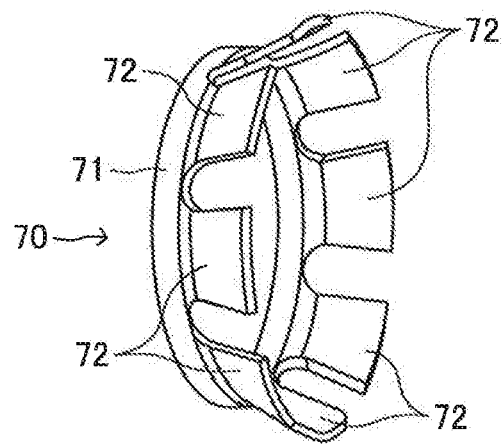
FIG. 13 is a perspective view of the elastic body used in the third modification.

FIG. 11 shows a second modification of the present invention. An elastic body 68 used in the second modification is an O-ring, and its material is the same as the elastic body 55.

A positioning bolt 69 used in the second modification includes the first head portion 51 and the first shaft portion 52, and an end portion of the first shaft portion 52 on the side toward the first head portion 51 is a large-diameter shaft portion 69a which is larger in diameter than the first male screw portion 53. The diameter of the large-diameter shaft portion 69a is smaller than that of the first head portion 51. The outer circumferential surface of the large-diameter shaft portion 69a is a cylindrical surface (having no thread groove). The elastic body 68 is fitted, in its free state, onto the outer circumferential surface of the large-diameter shaft portion 69a.

When the elastic body 68 is in the free state, the outer diameter of the elastic body 68 is smaller than the diameter Odh of the positioning through hole 35. Further, when the elastic body 68 is in the free state, the axial length of the elastic body 68 is larger than the axial length Lth of the positioning through hole 35. Therefore, when the elastic body 68 and the large-diameter shaft portion 69a are located within the positioning through hole 35, the positioning bolt 69 and the elastic body 68 have the same functions as the positioning bolt 50 and the elastic body 55.

FIGS. 12 to 16 show a third modification of the present invention. In the third modification, in place of the elastic body 55, an elastic body 70 which is an annular spring member formed of a metal having elasticity (for example, spring steel) is used. This elastic body 70 has an annular base portion 71 and a plurality of elastically deformable portions 72 protruding from the base portion 71. The elastically deformable portions 72 are arranged at equal angular intervals in the circumferential direction of the base portion 71. This elastic body 70 can be manufactured, for example, through press forming of a metal plate.

When the elastic body 70 is in its free state, the inner diameter of the base portion 71 is slightly larger than the diameter of the first shaft portion 52 of the positioning bolt 50. Also, when the elastic body 70 is in its free state, free ends of the elastically deformable portions 72 are located on the radially outer side of the elastic body 70 as compared with their proximal ends. Further, when the elastic body 70 is in its free state, the diameter of a circle passing through the free ends of the elastically deformable portions 72 is smaller than the diameter Odh of the positioning through hole 35.

Figure 14:
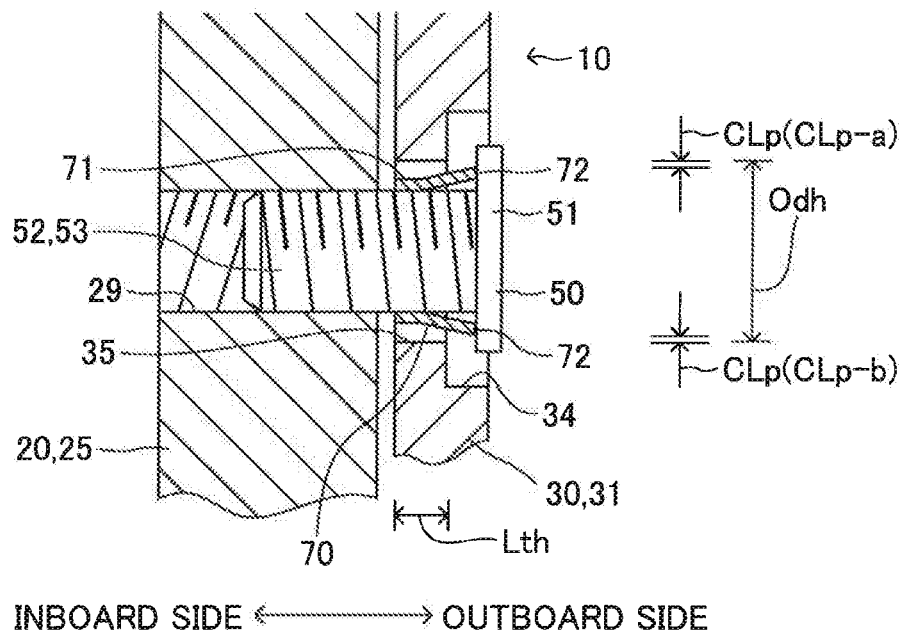
FIG. 14 is a partial sectional view of the brake rotor and the hub cut along the reference circle in a state in which the first male screw portion is in screw engagement with the positioning female screw hole in the third modification and the elastic body is in a free state.

When the base portion 71 of the elastic body 70 is attached to the first shaft portion 52, as shown in FIG. 14, a portion of the inner circumferential surface of the base portion 71 of the elastic body 70 in the free state comes into contact with the first shaft portion 52. Further, the elastically deformable portions 72 separate from the first shaft portion 52 toward the radially outer side of the first shaft portion 52.

As shown in FIG. 14, the positioning bolt 50 and the elastic body 70 integrated with each other are inserted into the head portion recess 34 and the positioning through hole 35 of the brake rotor 30 from the outboard side. Subsequently, the first male screw portion 53 is screwed into the positioning female screw hole 29.

In FIG. 14, the distance between the outboard-side surface of the flange portion 25 and the inboard-side surface of the first head portion 51 is larger than the axial length of the elastic body 70, and the elastic body 70 is located within the positioning through hole 35. At that time, since the base portion 71 of the elastic body 70 is spaced from the outboard-side surface of the flange portion 25 toward the outboard side, and the first head portion 51 is spaced from the bottom surface of the head portion recess 34 toward the outboard side, the elastic body 70 is in the free state.

As described above, the outer diameter of the elastic body 70 in the free state is smaller than the diameter Odh of the positioning through hole 35. Namely, the positioning clearance CLp, which is the clearance between each elastically deformable portion 72 and the inner circumferential surface of the positioning through hole 35 is greater than zero. Therefore, at that time, the positioning bolt 50 and the elastic body 70 can be easily inserted into the positioning through hole 35. Further, when the elastic body 70 is in the free state, the axial length of the elastic body 70 is larger than the axial length Lth of the positioning through hole 35.

Figure 15:
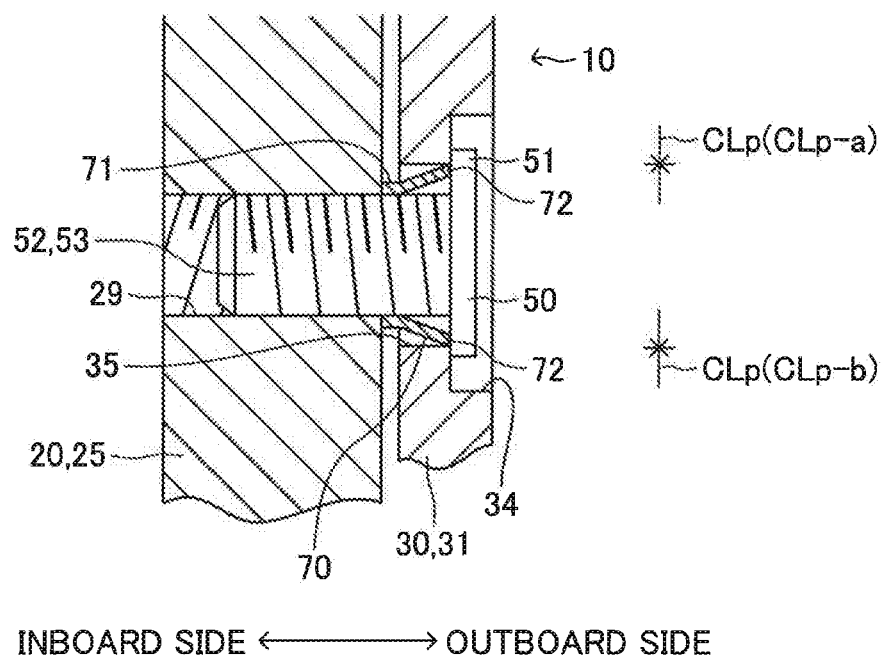
FIG. 15 is a sectional view corresponding to FIG. 14 and showing a state after the elastic body used in the third modification has elastically deformed.

When the amount of screw engagement of the first male screw portion 53 with the positioning female screw hole 29 is increased in the state of FIG. 14, as shown in FIG. 15, the first head portion 51 comes into contact with the bottom surface of the head portion recess 34 while pressing the elastically deformable portions 72 toward the inboard side, and the base portion 71 comes into contact with the outboard-side surface of the flange portion 25. Therefore, the elastically deformable portions 72 press the inner circumferential surface of the positioning through hole 35 radially outward while elastically deforming toward the radially outer side. Accordingly, the positioning clearance CLp becomes zero. Therefore, the worker can easily perform the rotational phase adjustment work.

Figure 16:
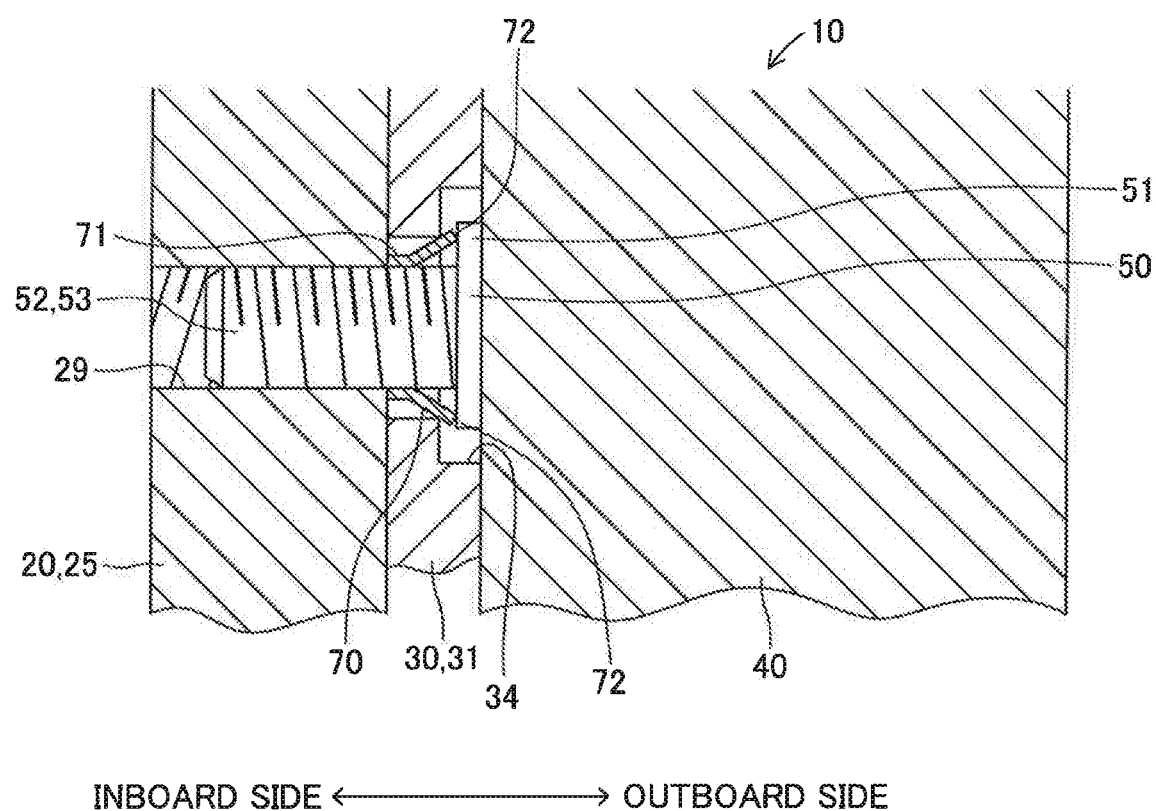
FIG. 16 is a sectional view corresponding to FIG. 14 and showing a state after the position-fixing bolts have been screwed into the position-fixing female screw holes.

Further, in a state in which the brake rotor 30 is in contact with the flange portion 25, the tire wheel 40 is fixed to the hub 20 and the brake rotor 30 through use of the position-fixing bolts 60. As a result, the brake rotor 30, which has been separated from the flange portion 25 toward the outboard side until this point, moves toward the inboard side and comes into contact with the outboard-side surface of the flange portion 25 as shown in FIG. 16. As a result, as shown in FIG. 16, the bottom surface of the head portion recess 34 may separate from the first head portion 51 toward the inboard side. Alternatively, although not illustrated, the contact between the bottom surface of the head portion recess 34 and the first head portion 51 is maintained, but the contact pressure between the first head portion 51 and the brake rotor 30 may drop.

However, for example, in the case where the bottom surface of the head portion recess 34 is separated from the first head portion 51 toward the inboard side, as shown in FIG. 16, the first head portion 51 continuously presses the elastically deformable portions 72 toward the inboard side. Therefore, while elastically deforming toward the radially outer side, the elastically deformable portions 72 press an outboard-side end portion of the inner circumferential surface of the positioning through hole 35 toward the radially outer side. Also, in the case where the contact between the bottom surface of the head portion recess 34 and the first head portion 51 is maintained, although not illustrated, the elastically deformable portions 72 pressed by the first head portion 51 toward the inboard side continuously press the inner circumferential surface of the positioning through hole 35 toward the radially outer side, while elastically deforming toward the radially outer side. Accordingly, in either case, the axial tension of the positioning bolt 50 (and the elastic body 70) does not drop.

As described above, the elastic body 70 in the third modification can exhibit the same function as the elastic bodies 55, 66, and 68.

The positioning bolt 50 (69) and the elastic body 55 (66, 68, 70) may be separately inserted into the positioning through holes 35.

In the above-described embodiment and modifications, the hub 20 may have a plurality of positioning female screw holes 29, and the brake rotor 30 may have a plurality of positioning through holes 35 and a plurality of head portion recesses 34. In this case, a plurality of positioning bolts 50 are inserted into the respective head portion recesses 34 and the respective positioning through holes 35, and the first male screw portions 53 of the positioning bolts 50 are screwed into the respective positioning female screw holes 29.

The position-fixing through holes 33 may be formed in the brake rotor 30 in such a manner that at least one of the position-fixing through holes 33 is located at a position deviated from the reference circle SC. In this case, the position-fixing female screw holes 28 are formed in the flange portion 25 in such a manner that each position-fixing female screw hole 28 faces a corresponding one of the position-fixing through holes 33.

The elastic body 55, 66, or 70 may be attached to the large-diameter shaft portion 69a of the positioning bolt 69, and the elastic body 68 may be attached to the first shaft portion 52 of the positioning bolt 50.

Figure 17:
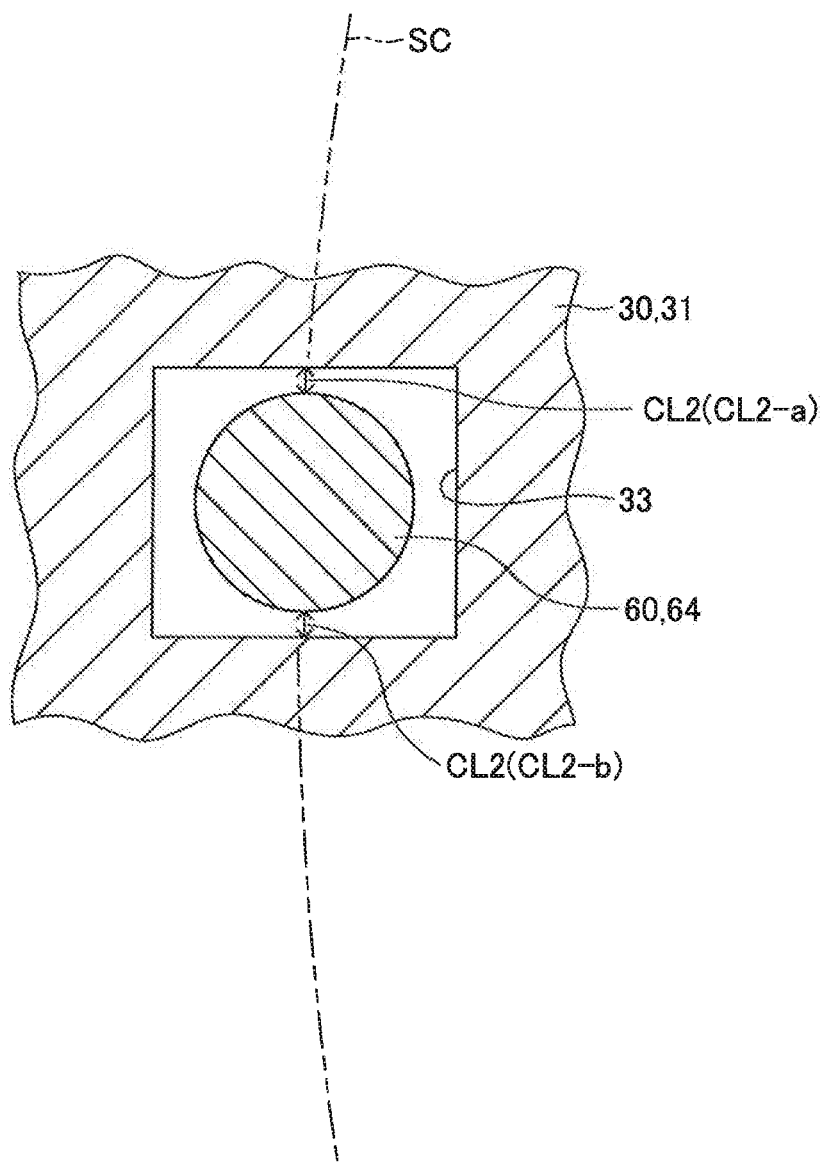
FIG. 17 is a sectional view of a position-fixing through hole and a second large-diameter shaft portion of a position-fixing bolt used in a fourth modification of the present invention.

Also, the position-fixing through holes 33, the positioning through hole 35, and/or a portion corresponding to the large-diameter shaft portion 69a may have a non-circular sectional shape. For example, as shown in FIG. 17, the position-fixing through holes 33 may have a square sectional shape. In this case, when the second large-diameter shaft portion 64 of each position-fixing bolt 60 and the corresponding position-fixing through hole 33 are approximately coaxial with each other, two clearances CL2-a and CL2-b are formed between the second large-diameter shaft portion 64 and the inner circumferential surface of the position-fixing through hole 33. Accordingly, the second clearance CL2 is formed by the two clearances CL2-a and CL2-b.

When the brake rotor 30 is provisionally fixed to the flange portion 25 by using the positioning bolt 50 (69) and the elastic body 55 (66, 68, 70), the outboard-side surface of the flange portion 25 and the inboard-side surface of the brake rotor 30 may come into contact with each other. In this case, when the tire wheel 40 is fixed to the hub 20 and the brake rotor 30 by using the position-fixing bolts 60, the bottom surface of the head portion recess 34 is unlikely to separate from the first head portion 51 toward the inboard side. However, in this case as well, when the axial tension generated by each position-fixing bolt 60 is large, the bottom surface of the head portion recess 34 may separate from the first head portion 51 toward the inboard side. Alternatively, although the contact between the bottom surface of the head portion recess 34 and the first head portion 51 is maintained, the contact pressure between the first head portion 51 and the bottom surface of the head portion recess 34 may decrease.

The positioning size of the positioning clearance CLp produced when the elastic body 55 (66, 68, 70) elastically deforms as a result of provisional fixing may be set to be larger than the second size L2. In this case, as described above, performance of the rotational phase adjustment work becomes difficult as compared with the case where the positioning size is smaller than the second size L2. However, in this case as well, the positioning size after the elastic body 55 (66, 68, 70) has elastically deformed is smaller than the size of the positioning clearance CLp in the direction of the reference circle SC at the time when the elastic body 55 is in the free state. Accordingly, in this case as well, performance of the rotational phase adjustment work becomes easier as compared with the case where the positioning size after the provisional fixing is equal to the size of the positioning clearance CLp in the direction of the reference circle SC at the time when the elastic body 55 is in the free state (i.e., before the provisional fixing).

The positioning size at the time when the brake rotor 30 is provisionally fixed to the flange portion 25 by using the positioning bolt 50 (69) may be greater than zero, so long as the positioning size is smaller than the size of the positioning clearance CLp in the direction of the reference circle SC at the time when the elastic body 55 (66, 68, 70) is in the free state. In this case as well, the worker can perform the rotational phase adjustment work easily as compared with the case where the positioning size after the provisional fixing is equal to the size of the positioning clearance CLp in the direction of the reference circle SC at the time when the elastic body 55 (66, 68, 70) is in the free state. Notably, in this case as well, preferably, the positioning size after the provisional fixing is smaller than the second size L2.

Further, when the brake rotor 30 is provisionally fixed to the flange portion 25 by using the positioning bolt 50 (69), at least a portion of the elastic body 55 (66, 68, 70) may plastically deform.

The diameter of the positioning female screw hole 29 may be set to be larger than the diameter of the position-fixing female screw holes 28, or be equal to the diameter of the position-fixing female screw holes 28. In other words, the diameter of the first shaft portion 52 (the first male screw portion 53) may be set to be larger than the diameter of the second large-diameter shaft portion 64 (the second male screw portion 65) or be equal to the diameter of the second large-diameter shaft portion 64.

The material of the positioning bolt 50 and the material of the position-fixing bolts 60 are not limited to metals, and the positioning bolt 50 and the position-fixing bolts 60 are not required to be solid. Further, the material of the positioning bolt 50 may differ from the material of the position-fixing bolts 60.

Also, the mechanical strength of the first shaft portion 52 may be set to be equal to or greater than the mechanical strength of the second large-diameter shaft portion 64. However, in this case as well, the number of the position-fixing bolts 60 is set to be greater than the number of the positioning bolt(s) 50 such that the total mechanical strength of all the position-fixing bolts 60 is greater than the total mechanical strength of all the positioning bolt(s) 50.

The distal end portion 61a of the second head portion 61 may have a sectional shape other than a hexagonal sectional shape (for example, a circular sectional shape).

The end portion of each wheel through hole 43 on the side toward the head portion recess 42 and the outer circumferential surface of the pressure contract portion 61b of the second head portion 61 may have a shape other than a portion of a spherical surface (for example, a taper surface or a flat surface orthogonal to the axis of the position-fixing bolt 60).

What is claimed is:

1. A structure for assembling a tire wheel, a brake rotor, and a hub,
    said hub having at least one positioning female screw hole and a plurality of position-fixing female screw holes and being supported on a vehicle body to be rotatable about a predetermined rotation center axis,
    said brake rotor having at least one positioning through hole and a plurality of position-fixing through holes, facing said hub from one side in a direction of said rotation center axis, and being rotatable relative to said hub about said rotation center axis,
    said tire wheel having a plurality of wheel through holes and facing said brake rotor from said one side,
    said structure comprising:
    at least one positioning bolt having a first head portion facing a surface of said brake rotor on said one side, and a first shaft portion which penetrates said at least one positioning through hole from said one side toward the other side in the direction of said rotation center axis and has a first male screw portion to be screwed into said at least one positioning female screw hole;
    a plurality of position-fixing bolts each having a second head portion which comes into contact with a surface of said tire wheel on said one side, and a second shaft portion which penetrates a corresponding one of said wheel through holes and a corresponding one of said position-fixing through holes from said one side toward said other side and has a second male screw portion to be screwed into a corresponding one of said position-fixing female screw holes so as to fix said tire wheel to said hub and said brake rotor while preventing the relative rotation of said brake rotor; and
    an annular elastic body attached to an outer circumferential surface of said first shaft portion and located in said positioning through hole, said elastic body having an outer diameter smaller than a diameter of said positioning through hole when said elastic body is in a free state, wherein, when said elastic body is squeezed between said first head portion and said hub as a result of said first male screw portion being screwed into said positioning female screw hole, said elastic body deforms to have an increased outer diameter as compared with the case where said elastic body is in the free state.

2. A structure for assembling a tire wheel, a brake rotor, and a hub according to claim 1, wherein a size of a clearance formed between said elastic body and an inner circumferential surface of said positioning through hole when said elastic body is squeezed between said first head portion and said hub, the size being measured in a circumferential direction about said rotation center axis, is smaller than a size in said circumferential direction of a clearance between an inner circumferential surface of each of said position-fixing through holes and said second shaft portion of a corresponding one of said position-fixing bolts.

3. A structure for assembling a tire wheel, a brake rotor, and a hub according to claim 2, wherein said elastic body has a chamfered portion which is provided at its end on the side toward said hub and whose diameter decreases gradually toward said hub.

4. A structure for assembling a tire wheel, a brake rotor, and a hub according to claim 3, wherein said elastic body has slippage prevention portions which come into contact with said first head portion and said hub, respectively, thereby generating a resisting force against relative rotation of said elastic body about said first shaft portion with respect to said first head portion and said hub.

5. A structure for assembling a tire wheel, a brake rotor, and a hub according to claim 2, wherein said elastic body has slippage prevention portions which come into contact with said first head portion and said hub, respectively, thereby generating a resisting force against relative rotation of said elastic body about said first shaft portion with respect to said first head portion and said hub.

6. A structure for assembling a tire wheel, a brake rotor, and a hub according to claim 1, wherein said elastic body has a chamfered portion which is provided at its end on the side toward said hub and whose diameter decreases gradually toward said hub.

7. A structure for assembling a tire wheel, a brake rotor, and a hub according to claim 6, wherein said elastic body has slippage prevention portions which come into contact with said first head portion and said hub, respectively, thereby generating a resisting force against relative rotation of said elastic body about said first shaft portion with respect to said first head portion and said hub.

8. A structure for assembling a tire wheel, a brake rotor, and a hub according to claim 1, wherein said elastic body has slippage prevention portions which come into contact with said first head portion and said hub, respectively, thereby generating a resisting force against relative rotation of said elastic body about said first shaft portion with respect to said first head portion and said hub.

* * * * *